(12) United States Patent
Grable et al.

(10) Patent No.: US 7,780,234 B2
(45) Date of Patent: *Aug. 24, 2010

(54) INERTIAL LATCH ASSEMBLY SUCH AS INCORPORATED INTO A REAR ROW PIVOTING SEAT BOTTOM INCLUDING A SLOTTED INERTIAL LOCK PLATE WITH RESISTIVE SUPPORT IN BOTH DESIGN AND UPRIGHT POSITIONS

(75) Inventors: David Grable, Clinton Township, MI (US); Keith Brantley, Utica, MI (US)

(73) Assignee: BAE Industries, Inc., Warren, MI (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/119,144

(22) Filed: May 12, 2008

(65) Prior Publication Data

US 2008/0211281 A1  Sep. 4, 2008

Related U.S. Application Data

(63) Continuation-in-part of application No. 11/439,665, filed on May 24, 2006, now Pat. No. 7,374,242.

(51) Int. Cl.
*B60N 2/30* (2006.01)
*B60N 2/00* (2006.01)

(52) U.S. Cl. ............... 297/331; 297/335; 296/65.05

(58) Field of Classification Search ......... 297/331, 297/332, 333, 335; 296/65.05
See application file for complete search history.

(56) References Cited

U.S. PATENT DOCUMENTS

| 5,156,437 A | 10/1992 | Hayakawa et al. |
| 5,156,438 A | 10/1992 | Hayakawa et al. |
| 5,158,338 A | 10/1992 | Hayakawa et al. |
| 5,195,802 A | 3/1993 | Hayakawa et al. |
| 5,320,411 A | 6/1994 | Sera et al. |
| 5,425,568 A | 6/1995 | Sliney et al. |
| 5,460,429 A | 10/1995 | Whalen |
| 5,476,307 A | 12/1995 | Whalen |

(Continued)

FOREIGN PATENT DOCUMENTS

JP  2002127796 A  5/2002

*Primary Examiner*—Rodney B White
(74) *Attorney, Agent, or Firm*—Gifford, Krass, Sprinkle, Anderson & Citkowski, P.C.

(57) ABSTRACT

An inertial latch assembly including a planar shaped sector pivotally mounted between a pair of spaced apart support plates. The sector exhibits a bottom including a central projecting shoulder separating first and second bottom surfaces. An arcuate interior channel in the sector is offset from its pivotal mounting location, a pin extending through a second channel defined in a selected support plate and seating within the arcuate channel so that the pin exerts a bias against the sector during travel along the arcuate interior channel. A pendulum is secured in sandwiching fashion between the support plates and proximate the bottom extending surface of the planar shaped sector, an arcuate edge thereof seating against a selected bottom extending surfaces of the rotatable sector, depending upon a pivoted position established between the sector and the support plates. The pendulum responds to an inertial impact condition by engaging against the underside shoulder of the sector and to prevent rotation of the sector relative to the support plates.

22 Claims, 5 Drawing Sheets

U.S. PATENT DOCUMENTS

| | | | |
|---|---|---|---|
| 5,603,550 | A | 2/1997 | Holdampf et al. |
| 5,800,015 | A | 9/1998 | Tsuchiya et al. |
| 5,842,744 | A | 12/1998 | Harmon |
| 6,012,771 | A | 1/2000 | Shea |
| 6,481,799 | B1 | 11/2002 | Whalen |
| 6,767,061 | B2 | 7/2004 | Ogino et al. |
| 6,832,815 | B2 | 12/2004 | O'Connor |
| 6,883,854 | B2 | 4/2005 | Daniel et al. |
| 6,883,868 | B2 | 4/2005 | Yoshida et al. |
| 6,902,234 | B2 | 6/2005 | Becker et al. |
| 7,086,696 | B2 | 8/2006 | Yudovich |
| 7,201,425 | B2 | 4/2007 | Tsujibayashi et al. |
| 7,252,320 | B2 | 8/2007 | Tsujibayashi et al. |
| 7,338,118 | B2 | 3/2008 | Ichikawa et al. |
| 7,374,242 | B2 * | 5/2008 | Champ et al. ............... 297/331 |
| 2005/0146186 | A1 | 7/2005 | Kinnou et al. |

\* cited by examiner

INERTIAL LATCH ASSEMBLY SUCH AS INCORPORATED INTO A REAR ROW PIVOTING SEAT BOTTOM INCLUDING A SLOTTED INERTIAL LOCK PLATE WITH RESISTIVE SUPPORT IN BOTH DESIGN AND UPRIGHT POSITIONS

CROSS-REFERENCE TO RELATED APPLICATIONS

This application is a Continuation-in-part of application Ser. No. 11/439,665 filed on May 24, 2006, entitled SEAT LATCH ASSEMBLY FOR A REAR ROW STANDING SEAT INCLUDING A SLOTTED INERTIAL LOCK PLATE WITH RESISTIVE SUPPORT IN BOTH DESIGN AND UPRIGHT POSITIONS.

FIELD OF THE INVENTION

The present invention generally pertains to an inertial locking assembly, and such as which can be utilized in any hinged application established between first and second components in which controlled inter-rotation is desired. In a further preferred application, the present invention is employed in use with a pivoting seat.

More specifically, the present invention teaches a rear-row stadium style seat in use with such as a pickup truck type vehicle and which in particular utilizes a foldable seat bottom. A pendulum actuated inertial locking mechanism incorporates a batwing shape defining an integrated lower portion of a pivoting sector exhibiting a unique arcuate profile for facilitating rotating motion of an affixed seat bottom between downwardly rotated design and upwardly folded stowed positions. The configuration of the rotating sector is further such that it provides a degree of resistive support at both extreme locations to prevent inadvertent rotation of the seat bottom.

DESCRIPTION OF THE PRIOR ART

The prior art is well documented with examples of seat fold mechanisms for use with such as rear row vehicle seats. In particular, such seat fold mechanisms are known which are in use with "stadium style" seat assemblies incorporating a pivotal seat bottom (such as associated with a pickup rear seat), and which is convertible between a use/design position and an upwardly folded/stowed position.

A first example of a prior art stadium style seat fold mechanism is set forth in U.S. Pat. No. 6,012,771, issued to Shea, and which discloses a seat bottom pivotally mounted relative to a seat back and movable between a seating position and an upright folded position. A detent mechanism provides a degree of resistance to movement of the seat bottom from the folded upright and the seating position. An inertia latch mechanism is provided for engaging the seat bottom in the folded upright position in response to a rapid deceleration of the vehicle such as caused by a collision.

U.S. Pat. No. 5,842,744, issued to Harmon, teaches a seat dual position locking mechanism for locking a seat component in a stowed or use position for preventing sudden pivotal movement of the seat component in a sudden high energy acceleration or deceleration. The locking mechanism includes a support bracket adapted for mounting on the vehicle floor and a pivot plate pivotally mounted to the support bracket. The pivot plate is secured to the vehicle seat component for pivotal movement therewith. The pivot plate includes a plurality of lock teeth extending therefrom. A pendulum member or pawl is pivotally connected to the support bracket and operative for locking engagement with the lock teeth for preventing substantial seat component movement in a forward or rearward high energy impact.

O'Connor, U.S. Pat. No. 6,832,815, teaches a seat latch assembly which includes a seat bottom and associated first frame member, a seat back and second frame member partially mounted on the first frame member about a first pivot, and a latch mechanism. The latch mechanism includes a pin mounted on one of the first and second frame members. The latch pivotally attaches to the other of the first and second frame members about a second pivot. Of note, the latch has an open angled hook portion and is movable about the second pivot between disengaged and engaged positions, and dependent upon whether the hook is in contact or spaced from the pin in order to selectively prevent the first frame member from pivoting relative to the second frame member about the first pivot.

U.S. Pat. No. 5,476,307, issued to Whalen, teaches an inertia sensitive hinge mechanism including an inertia activator with first and second cam surfaces and a wedging surface located therebetween. The inertial activator includes a center of gravity spaced from the center of rotation. Of note, an upper hinge member includes an arcuate cam surface on opposing plates for receiving a pin. The pin travels between first and second opposite ends separated by a slot exhibiting a continuous arcuate curvature.

Finally, U.S. Pat. No. 6,767,061, issued to Ogino, teaches a tip-up seat including a rock unit which holds the seat cushion in at least one position. The seat includes a seat back, a seat cushion, and a tip-up unit which tips up a forward end side of the seat cushion from a base position to an upward tip-up position. The rock unit holds the seat cushion in at least one position between the base and tip-up positions and includes a first gear and a second gear mutually engaged to permit tip-up motion of the seat cushion and to restrict the tip-down motion of the seat cushion.

SUMMARY OF THE INVENTION

The present invention discloses an inertial latch assembly, and such as which can be incorporated into a control-pivoting seat assembly. More specifically, the inertial latch assembly according to the present inventions can be adapted for use with a rear-row stadium style seat in use with such as a pickup truck type vehicle, such a seat including a frame with first and second pairs of spaced apart stanchion supports and pivotally associated brackets being arranged on opposite ends of first and second seat components associated with a 60/40 rear stadium seat assembly. In this arrangement, a first latch assembly is typically arranged on a first side of a first selected seat component, whereas a second latch assembly is arranged on a second opposite most side of a second selected seat component.

The inertial locking mechanism incorporates a batwing shape defining an integrated lower portion of a pivoting sector. The lower defined batwing shape further exhibits a unique arcuate profile for facilitating rotating motion of an affixed seat bottom between downwardly rotated design and upwardly folded stowed positions. The configuration of the rotating sector is further such that it provides a degree of resistive support at both extreme locations to prevent inadvertent rotation of the seat bottom.

The batwing outer profile associated with the sector extends along a bottom face between first and second sides and further includes first and second bottom extending surfaces interrupted by an intermediate shoulder projection. The sector is mounted in sandwiching fashion between a pair of fixed and spaced apart support plates, these in turn secured to a selected side of the seat frame.

A rotatable pendulum is likewise secured between the support plates proximate to the underside of the batwing shaped portion of the rotatable seat sector. The pendulum includes a lower inertial inducing portion interconnected with an upper triangular shaped portion and in order to align the upper portion against either of the bottom extending surfaces. Responsive to an inertial load, the upper pendulum portion is engaged in abutting fashion against the intermediate shoulder projection and in order to prevent the rotatable sector from moving in either direction.

The sector further exhibits an arcuate interior channel offset from a slaved rotating connection of the pivotable sector. The arcuate channel includes a middle arcuate portion and first and second reverse arcuate extending end portions, these corresponding in the illustrated embodiment to design and stowed positions associated with rotation of the first seat component (seat bottom) relative to an upwardly extending second seat component (or seat back).

A spring load biased detent lever is biasingly and rotatingly secured against a surface of a selected outer support opposite the rotating sector and pendulum. A pin extends from a further location of the detent, through a further channel defined in the selected support and to seat with the arcuate interior channel. In this fashion, the pin establishes a combined communicating and offsetting relationship relative to the sector channel in order to exert a bias during travel along the interior channel corresponding to the rotation of the seat component.

An inertial responsive leaf spring is secured to the sector in substantially aligning and interposing fashion between the first and second bottom extending surfaces separated by the shoulder projection and proximately located upper edge of the upper triangular shaped portion of the pendulum. The configuration of the rotating sector, pendulum, and inertial responsive springs are such that the rotating sector is permitted substantially unimpeded motion upon pivoting of a first seat component (bottom) relative to a second (and in the illustrated variant fixed) seat component (back). The reverse bend configuration associated with the first and second end portions of the arcuate and pin receiving channel further provide an intended degree of resistive support at either angled slot end location corresponding to extended/design or upright/stowed positions of the seat bottom, providing both an additional level of tactile feel when the rotatable seat component has achieved a desired converted position, as well as assisting against inadvertent rotation of the seat bottom in cooperation with the architecture associated with the inertial locking assembly.

The pendulum is further permitted a slight degree of offset displacement in combination with being rotationally supported, and by virtue of a suitably dimensioned pendulum bushing employed for securing the pendulum to a further pivotal location associated with the support plates, thereby providing a combined level of support and limited pivoting motion associated with the pendulum. As previously stated, the pendulum is constructed to engage the shoulder abutment associated with the underside configured batwing shaped sector, and in response to an experienced inertial impact condition, and again preventing rotation of the first (bottom) seat component.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
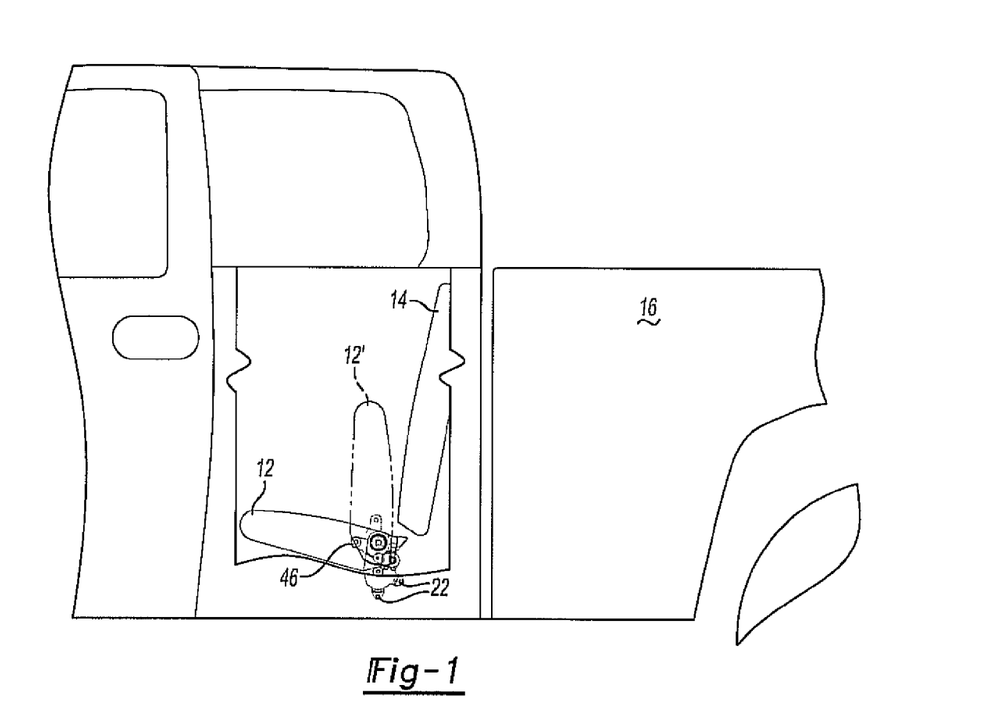
FIG. 1 is an environmental plan view in partial cutaway illustrating the seat latch assembly in a design position with the seat bottom downwardly folded and further illustrating the range of pivotal motion of the seat bottom between the design position and an upwardly folded stowed position, such as relative to a fixed seat back.

Referring now to FIG. 1, an environmental plan view is illustrated in partial cutaway of an inertial latch assembly 10 in a design position, and illustrating a seat bottom 12 downwardly folded relative to a (typically fixed) seat back 14 according to the present invention. The seat bottom 12 is further shown in an upwardly pivoted phantom position, at 12', and which is illustrative of the range of rotational motion provided for by the inertial latch assembly.

As previously discussed, the present invention discloses an inertial latch assembly such as which can be incorporated into a control-pivoting seat assembly. More specifically, the inertial latch assembly according to the present inventions can be adapted for use with a rear-row stadium style seat in use with such as a pickup truck type vehicle, see at 16, such a seat including a frame with first and second pairs of spaced apart stanchion supports and pivotally associated brackets (not shown), these being arranged on opposite ends of first and second seat components associated with a 60/40 rear stadium seat assembly.

In such an arrangement, a first latch assembly is typically arranged on a first side of a first selected seat component, whereas a second latch assembly is arranged on a second opposite most side of a second selected seat component. It is also understood that other seat supporting arrangements, beyond those illustrated herein, are contemplated without limitation in use with the inertial latch assembly 10, these including incorporating into both seat bottom (pan) folding as well as seat back folding applications. Furthermore, it is understood that the inertial latch assembly 10 is capable of being utilized in non-seat related applications, exemplary applications of which include adapting the inertial latch assembly into such as a refrigerator (appliance) door or other such application in which it is desired to provide inertial control of a pivotally supported member.

Figure 2:
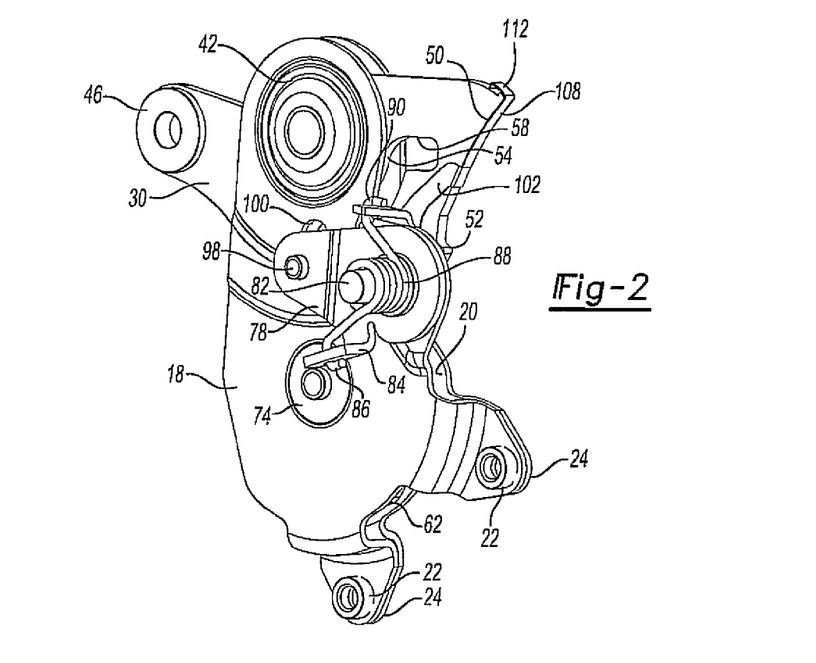
FIG. 2 is a perspective view of the inertial latch assembly in a design position configuration and according to the present invention.
Figure 3:
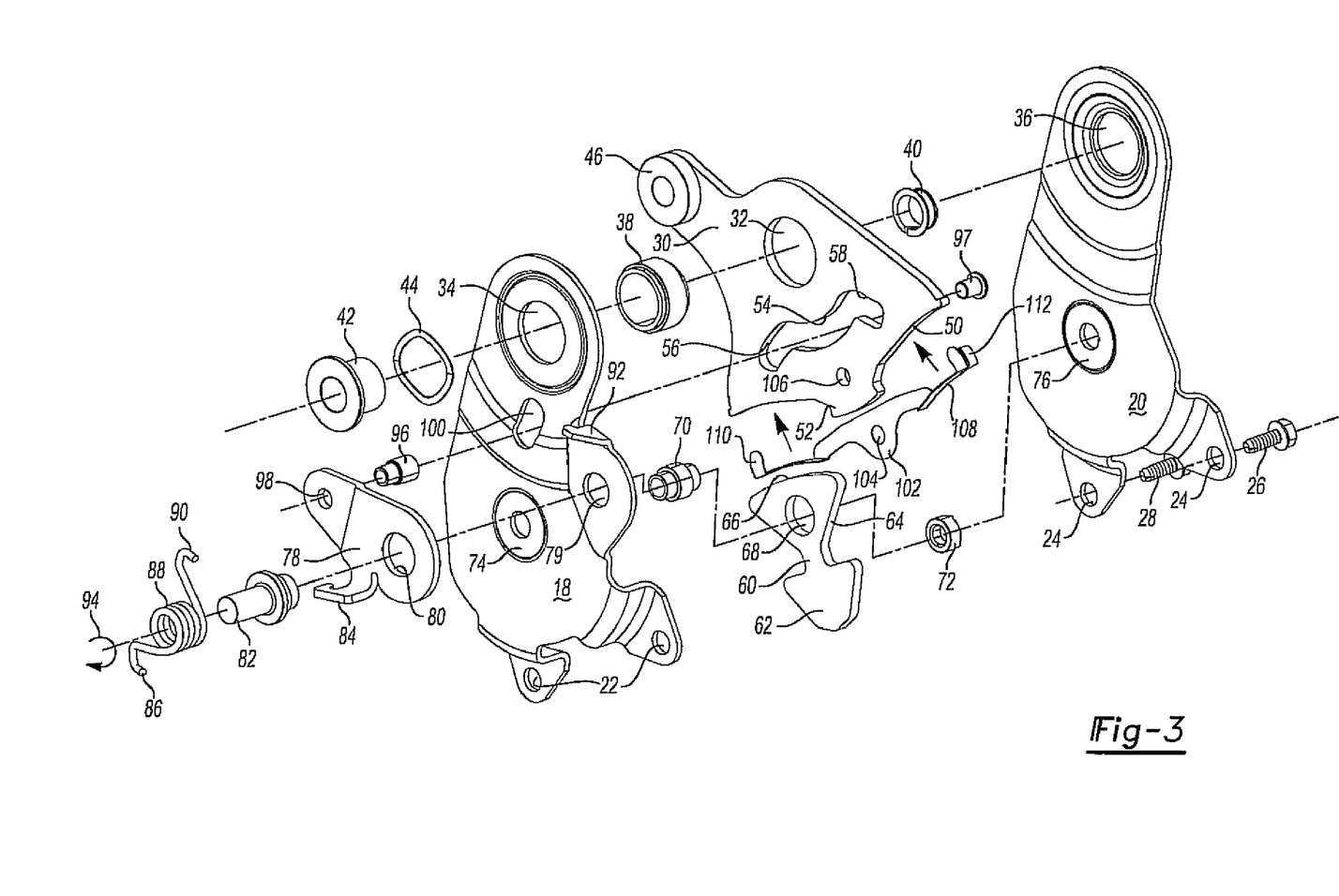
FIG. 3 is an exploded view of the inertial latch assembly according to the present invention.

Referring now to the perspective view of the inertial latch assembly as shown in the design position configuration of FIG. 2, in cooperation with the exploded view of FIG. 3 and the succeeding views of FIGS. 4-6, the inertial latch assembly 10 will now be described in greater detail. As previously described, the selected application for the latch assembly 10 is as part of a rear (second) row vehicle jump seat and which includes a pair of support plates 18 and 20 including lowermost disposed stanchion mounting locations, see pairs of locations at 22 and 24, respectively. Fasteners, 26 and 28 in FIG. 3, are provided for securing through the aligning pairs of mounting locations 26 and 28 and for securing each assembly 10 to a seat side disposed floor location of the vehicle 16 (see again FIG. 1). As again described previously, a preferred variant contemplates a 60/40 stadium seat assembly and by which first and second pairs of stanchion supports (not shown) define opposite frame supporting ends of a pair of likewise width dimensioned seat components 12, it being understood that other full width seat, split seat or singular inertial latch applications are envisioned as being possible within the scope of the inventions set forth herein.

As best shown in the exploded view of FIG. 3, each of the support plates 18 and 20 is constructed of a steel material and includes a substantially planar shaped and configured body. The inertial locking mechanism incorporates a generally batwing shape defining an integrated lower portion of a pivoting and thin cross sectional sector 30, this being configured to being mounted in sandwiching fashion between the support plates 18 and 20.

The pivoting sector 30 exhibits pivot point established by an aperture defined by an inner annular rim or surface 32, this aligning with corresponding inner rim locations 34 and 36 associated with upper end locations of each of the support plates 18 and 20. Referring still to FIG. 3, a pivot bushing 38 is located between the support plate 18 and the sector 30, such that the bushing 38 seats between the aperture defined locations 34 and 32. A secondary and small diameter bushing 40 is likewise coaxially positioned between sector 30 and the support plate 20 and, in combination with an outer inserting collar mount 42 and spacer washer 44, pivotally secures the sector 30 between the support plates 18 and 20 in the fashion illustrated.

The pivoting sector includes an upper projecting end (see collar 46) through which an appropriate fastener (not shown) is secured in order to mount to a side location of the pivoting member (such as seat bottom 12, also known as seat pan). The lower defined batwing shape profile associated with the seatback 30 further exhibits a unique arcuate profile for facilitating rotating motion of the affixed seat bottom 12 between the downwardly rotated design 12 and upwardly folded stowed 12' positions (again FIG. 1). As will be described in further detail, the configuration of the rotating sector 30 is further such that it provides a degree of resistive support at both extreme locations to prevent inadvertent rotation of the seat bottom 12.

The batwing outer profile associated with the sector 30 extends along a bottom thereof and further includes first and second bottom and slightly arcuate extending surfaces 48 and 50 interrupted by an intermediate shoulder projection 52. The sector 30 further exhibits an arcuate interior channel offset from the slaved rotating connection (see again aperture defining rim 32) of the pivotable sector. The arcuate channel includes a middle arcuate portion 54 and first 56 and second 58 reverse arcuate extending end portions, these corresponding in the illustrated embodiment to design and stowed positions associated with rotation of the first seat component 12 (seat bottom) relative to an upwardly extending second (fixed) seat component (or seat back) 14. It is however contemplated that other configurations associated with an appropriately arcuately and interiorly defined channel are contemplated within the scope of the invention.

A rotatable and inertially engaging pendulum 60 is likewise secured between the support plates 18 and 20 proximate to the underside of the batwing shaped portion of the rotatable seat sector. The pendulum 62 includes a lower inertial inducing portion 62 interconnected with an upper triangular shaped portion 64 and which is mounted in a slightly rotating and likewise sandwiching fashion between the support plates 18 and 20 and proximate an underside of the pivoting sector 30. As will be described in subsequent detail, and responsive to experiencing an inertial load, the upper pendulum portion 64 is engaged in abutting fashion against a selected side surface associated with the intermediate shoulder projection 52, concurrent with a slightly arcuate configured edge profile 66 of the triangular shaped portion 64 seating with a selected bottom and slightly arcuate extending surfaces 48 or 50, and in order to prevent the rotatable sector from moving in either direction until the inertial load (such as associated with a front or rear vehicle crash or sudden acceleration/deceleration) ceases.

An aperture 68 defined in the upper triangular portion 64 of the pendulum 60 receives an inertial locking rivet 70, this passing through the aperture 68. A plastic bushing 72 engages from an opposite side and in order to secure the pendulum with additional mounting locations 74 and 76 associated with the support plates 18 and 20 for securing the pendulum 60 in sandwiching and aligning fashion relative to the batwing profile associated with the underside of the rotating sector 30. The sizing of the bushing 72 permits the pendulum a minor degree of linear misalignment (this facilitating ease of seating of the upper surface 66 with a selected underside of the seat sector). Concurrently, the configuration of the sandwiching plates 18 and 20 further prevents the arcuate opposing edge profile 66 of the pendulum 60 from laterally misaligning with a selected bottom side surface 48 and 50 of the rotating sector 30, such being a concern in instances where higher loads may result in some inherent degree of misalignment of the components.

A spring load biased detent lever 78 is biasingly and rotatingly secured against an exterior surface of selected support plate 18, and on a side opposite the rotating sector 30 and pendulum 60. The detent lever 78 includes an interior aperture 80, this aligning with a further mounting location 79 defined in the support plate 18 and through which pendulum inertial locking rivet 70 is inserted. A projecting side of the rivet 70 engages the bushing 72, and so that the detent lever 78 defines a common rotating axis with the pivotally supported pendulum 60.

An angled portion 84 of the detent lever 78 (see again FIGS. 2 and 3) is engaged by a first curled extending end 86 of a clock spring 88 and which is seated over the rivet 82. A second curled end 90 of the spring 88 engages an exteriorly angled tab 92 associated with the support plate 18, and in order to bias the detent lever 78 in a selected direction, e.g. clockwise as shown by arrow 94 in FIG. 3.

A pin 96 extends from a further seating location (see aperture 98 in FIG. 3) associated with the detent lever 78 and through a second channel 100 defined in the support plate 18 and which extends in a combined communicating and offsetting fashion relative to the sector channel (smile shaped with central arcuate portion 54 and reverse smile end portions 56 and 58). In this manner, an end of the pin 96 seats within the batwing sector arcuate channel and exerts a bias against the sector 30 (again in response to the clockwise bias exerted by the clock spring 88) during associated travel along the overlapping interior channel configuration. A seating rivet 97 (see FIG. 3) engages a remote projecting end of the pin 96 from a reverse surface of the arcuate channel 54.

Figure 4:
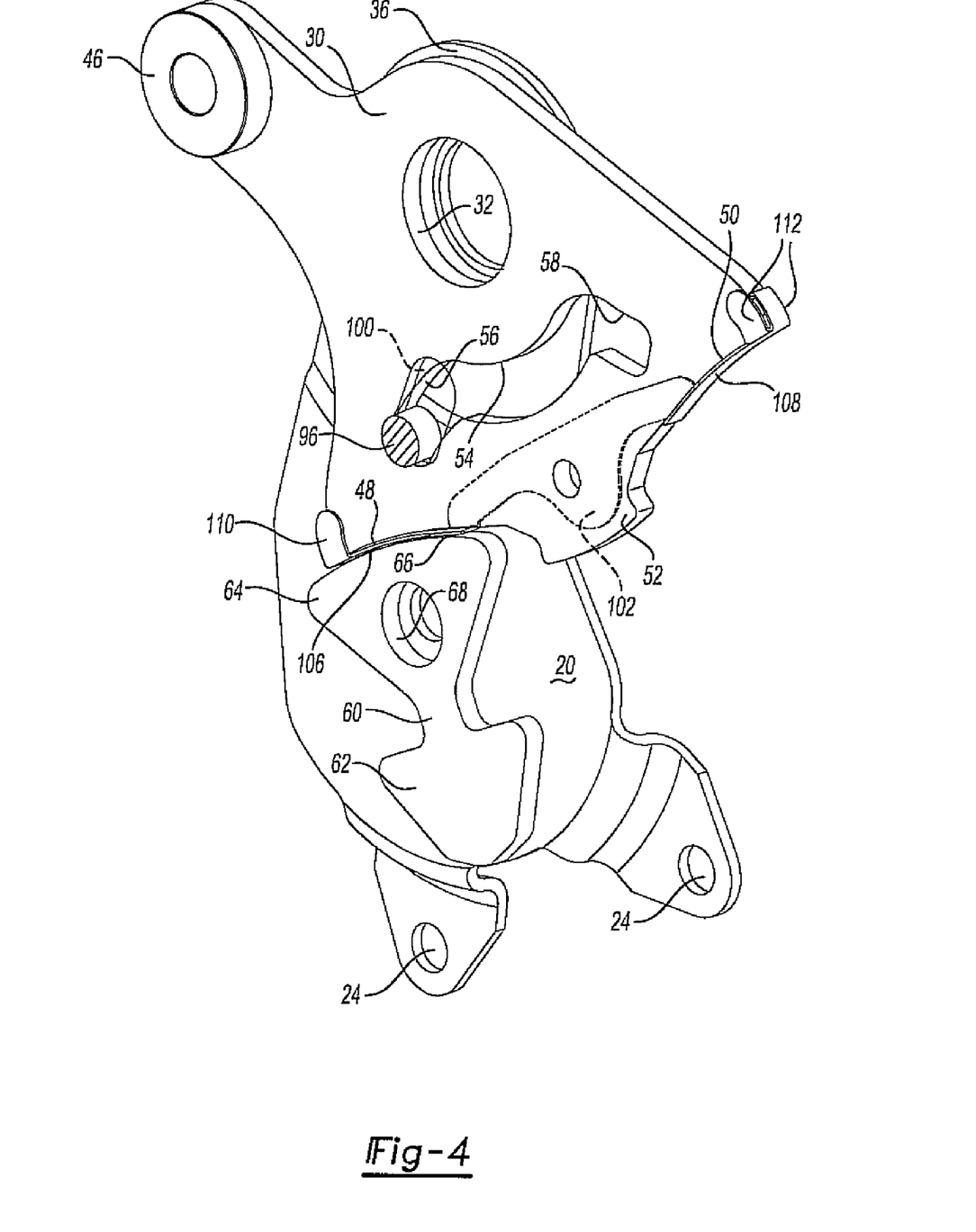
FIG. 4 is an illustration similar to that shown in FIG. 2, with outer support plate and detent lever assembly removed, and in order to illustrate a first engagement configuration established between the pendulum and a first bottom extending surface associated with the bottom leaf spring supported seat sector.

As is further shown in additional detail in the phantom designation of the overlapping channel 100 in FIG. 4 (i.e. the support plate 18 is not shown), the channel 100 exhibits a slightly upward angle relative to the arcuate channel portion (see 56). As will be subsequently described in reference to the first and second rotated positions of the sector 30 in FIGS. 5 and 6, the bias exerted on the pin 96, combined with the configuration of the rotatable/translatable arcuate channel (56, 54, 58) relative the overlapping secondary 100, results in the sector 30 pivoting from the (design) position of FIG. 5 to the upwardly pivoted (stored) position of FIG. 6, further such that a desired degree of resistive (tactile) contact is experienced between the pin 96 and each reverse angled end portion 56 and 58 of the arcuate channel 54. The degree of angular deflecting offset permitted by the overlapping channel 100 (through which the pin 96 seats) allows the pin 96 to translated through the channel 54 prior to reseating in the other angled end portion 58, again in a likewise resistive contacting fashion indicative of the sector 30 achieving the desired (stowed) end-position of FIG. 6.

An inertial responsive leaf spring 102 is secured to the sector 30 in substantially aligning and interposing fashion between the first 48 and second 50 bottom extending surfaces separated by the shoulder projection 52 and proximately located upper (arcuate) edge 66 of the upper triangular shaped portion 64 of the pendulum 60. A sector rivet (not shown) engages through a central mounting location 104 associated with the leaf spring 102 and an adjoining mounting hole 106 defined in a lower location of the batwing sector, in order to secure the leaf spring 102 to the shoulder projection 52 of the rotating sector 30. First and second outwardly extending wing portions associated with the leaf spring 102, see at 106 and 108, are secured in aligning and closely spaced fashion relative to the bottom surfaces 48 and 50 of the sector 30, each of the wing portions 106 and 108 terminating in a pair of end configured seating tabs (see at 110 and 112 in FIG. 4).

The configuration of the rotating sector 30, pendulum 60, and inertial responsive spring 102 are such that the rotating sector 30 is permitted substantially unimpeded motion upon pivoting of the associated seat component (bottom) 12 relative to the further fixed seat component (back) 14. As again previously described, the reverse bend configuration associated with the first 56 and second 58 end portions of the arcuate and pin receiving channel 54 further provide an intended degree of resistive support at either angled slot end location corresponding to extended/design (FIG. 5) or upright/stowed (FIG. 6) positions of the pivotal seat member 12, this again providing both an additional level of tactile feel when the rotatable seat component has achieved a desired converted position, as well as assisting against inadvertent rotation of the seat bottom in cooperation with the architecture associated with the inertial locking assembly.

The pendulum 60 is further permitted a slight degree of offset displacement in combination with being rotationally supported, and by virtue of a suitable dimension designed into the pendulum bushing 72, employed for securing the pendulum 60 to a further pivotal location associated with the support plates 18 and 20, thereby providing a combined level of support and limited pivoting motion associated with the pendulum 60. As previously stated, a corner edge associated with the mating surface 66 of the pendulum 60 is constructed to engage the shoulder abutment 52 associated with the underside configured batwing shaped sector, and in response to an experienced inertial impact condition, again preventing rotation of the first (bottom) seat component.

Figure 5:
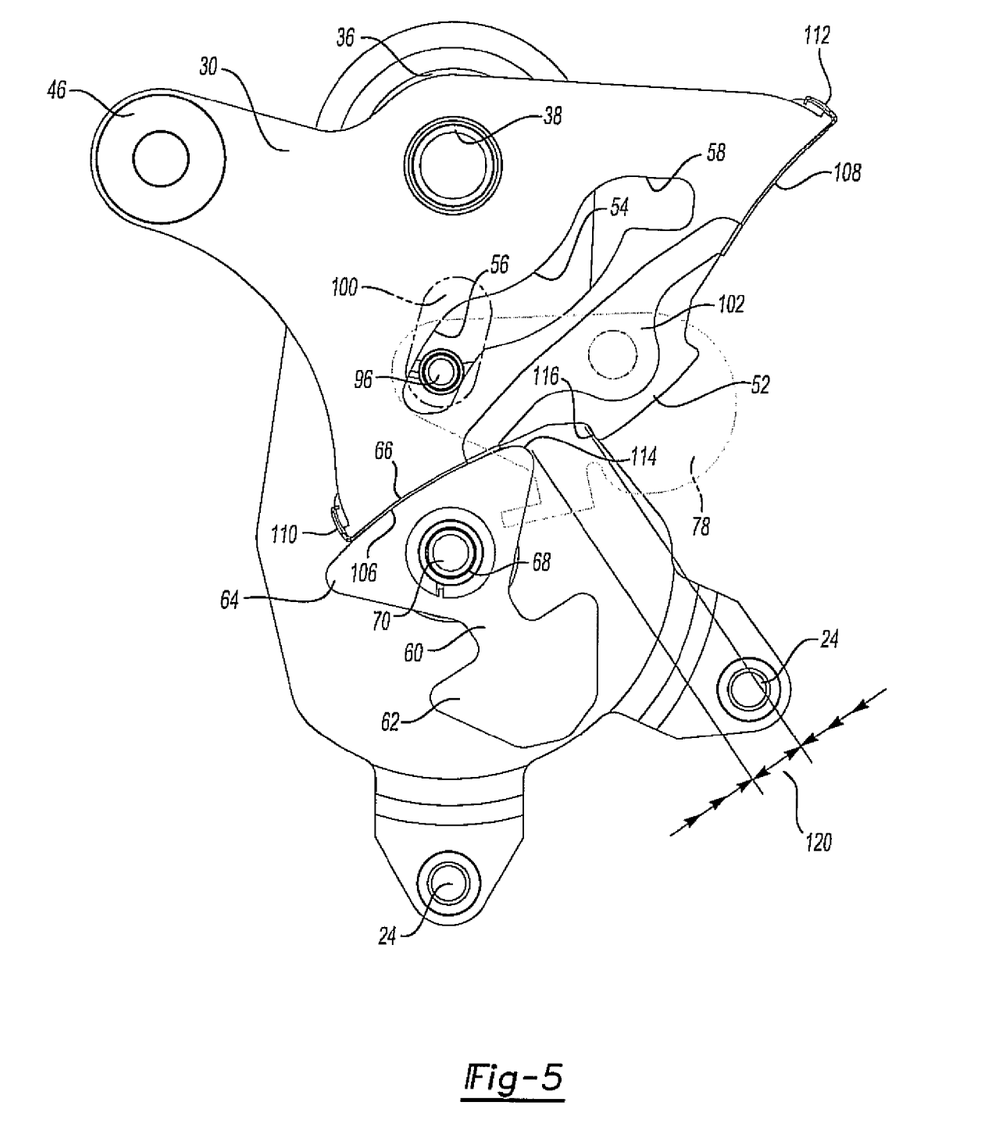
FIG. 5 is a front plan view of the inertial latch assembly in FIG. 4 and further illustrating the detent lever in phantom.
Figure 6:
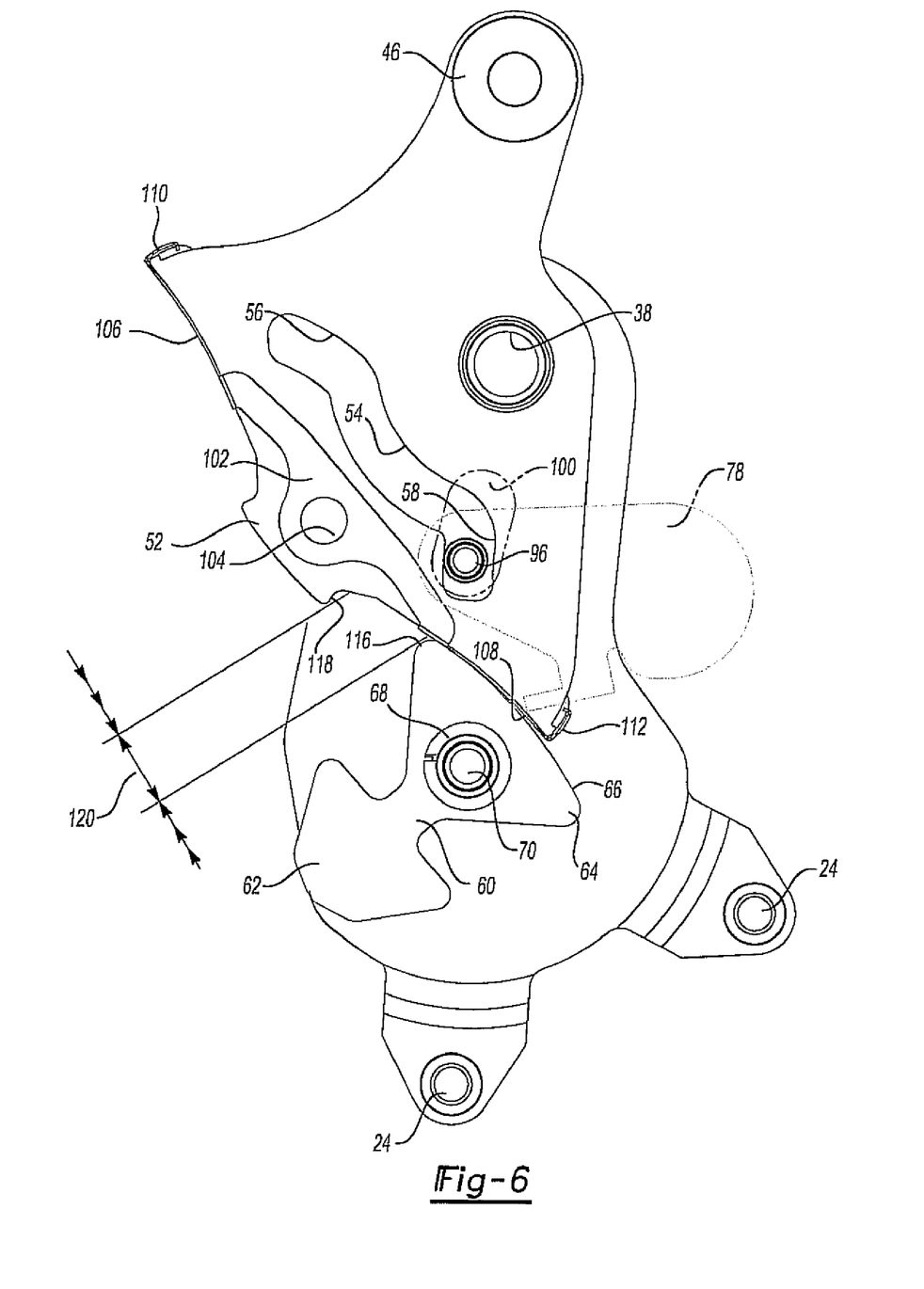
FIG. 6 is a further front plant view of the inertial latch assembly with the rotatable sector control pivoted to an upward stowed position, and by which the pendulum is reseated with a second bottom extending surface associated with the leaf spring supported seat sector.

A range of inertial contacting motion established between the corner edges of the pendulum (see corner 114 in FIG. 5 and corner 116 in FIG. 6) and associated edges of the underside shoulder projection 52 (see further at 116 in FIGS. 5 and 118 in FIG. 6). These define respectively ranges 120 and 122 in FIGS. 5 and 6 of inertial contacting displacement between the pendulum 60 and the central underside shoulder 52 of the pivoting sector 30, this again in order that a sudden rotational force exerted on the pendulum 60 (again resulting from a rotation imparting motion exerted by the underside portion 62) causes the selected corner 114 or 116 to pivot into abutting contact with the associated shoulder edge 116 or 118, and further depending upon the relative position of the rotating sector 30 (e.g. either design position in FIG. 5 or upright position in FIG. 6) with the support plates 18 and 20.

In operation, the downward bias exerted by the detent lever extending pin 96, seating in the communicating channel portions 56, 54, and 58, is counteracted by the slaved rotating motion of the batwing sector 30. Rotation of the sector 30, from the design position of FIG. 5 to the stowed position of FIG. 6 causes the biasing pin 96 to successively travel from reverse arcuate portion 56, through central arcuate portion 54, and finally to seat within the reverse arcuate portion 58. The downward bias exerted by the pin 96 creates a minimal degree of resistance at the reverse bend locations associated with the boundary zones established between main channel portion 54 and the reverse angled end channel portions 56 and 58, this again causing a degree of tactile engagement of the sector 30 in either the design or upright stowed position, and from which a desired minimal degree of force is required to actuate the attached seat bottom 12 in rotating fashion between the two positions, and such as by grasping the cushion edge of the seat 12. The selected wing portion 106 or 108 of the leaf spring 102 is initially spaced an incremental distance away from underside surfaces 48 and 50 of the sector 30 and, upon being contacting by the opposing surface 66 of the pendulum 60, is subsequently compressed to align the first and second bottom extending surfaces 48 and 50 and the arcuate edge 66 of the pendulum 60.

This occurs regardless of whether the seat is in the design or stowed position, and at which the associated upper edge of the pendulum 60 would be rotated slightly into engagement with the central shoulder projection 52 of the batwing from either bottom surface 48 or 50. Accordingly, the complementing architecture of the batwing sector and pendulum prevents rotation of the seat component 12 either upwardly from the design to stowed position (resulting from a rearward impact occurrence) or downwardly from the stowed to design portions (resulting from a forward impact occurrence).

The noise emitted from the pendulum 60 contacting both ends 106 and 108 of the leaf spring 102 is small, due to the small mass of the leaf spring and the clearance gaps existing between the leaf spring and the mounting underside location of the sector 30. As the sector 30 continues to travel to the final design (seated) position, the associated leaf spring end 106 (FIG. 5) is compressed so that sector surface 48 and leaf spring end 106 and pendulum surface 66 are all in contacting proximity.

Likewise, and as the sector 30 is articulated toward the stowed position (FIG. 6), the sector surface 50 and overlaying leaf spring end 108 are contacted by the pendulum surface 66, compressing spring end 108 so that sector surface 50, leaf spring surface 108 and pendulum surface 66 are all in contacting proximity.

Having described my invention, other and additional preferred embodiments will become apparent to those skilled in the art to which it pertains, and without deviating from the scope of the appended claims.

We claim:

1. An inertial latch assembly, comprising:

a planar shaped sector pivotally mounted between a pair of spaced apart support plates, said sector exhibiting a bottom extending surface further including a central projecting shoulder portion separating the bottom extending surface into first and second bottom extending surfaces, said sector further exhibiting an arcuate interior channel which is offset from said pivot mounting location, a pin extending through a second channel defined in a selected support plate and seating within said arcuate interior channel, said pin exerting a bias against said sector during travel along said interior channel; and a pendulum pivotally secured in sandwiching fashion between said support plates and proximate said bottom extending surface of said planar shaped sector, said pendulum exhibiting an arcuate edge seating against a selected one of said first and second bottom extending surfaces of said rotatable sector, depending upon a pivoted position established between said sector and said support plates;

said pendulum responding to an inertial impact condition by engaging said shoulder projection of said pivotal sector and preventing rotation of said sector relative to said support plates.

2. The latch assembly as described in claim 1, further comprising a detent lever biasingly and rotatingly secured against an exterior surface of a selected support plate opposite said sector and pendulum, said pin extending from a remote location of said detent lever offset from a pivotal connection.

3. The latch assembly as described in claim 2, further comprising a clock spring rotatively biasing a pivot pin pivotally supporting said detent lever to said support plate and simultaneously biasing said remote located pin.

4. The latch assembly as described in claim 3, further comprising an extending portion of said detent lever being engaged by a first curled extending end of said clock spring, an opposite second curled end engaging an exteriorly angled tab associated with said selected support plate, and in order to bias said detent lever in a selected rotational direction.

5. The latch assembly as described in claim 1, further comprising an inertial responsive leaf spring secured to said planar shaped sector between said first and second bottom extending surfaces and said arcuate edge of said pendulum, said leaf spring being initially spaced away from said sector upon contacting said pendulum, said leaf spring being compressed to align with at least one of said first and second bottom extending surfaces and said arcuate edge of said pendulum.

6. The latch assembly as described in claim 1, said arcuate edge of said pendulum extending from a spaced location from a pivot point and relative an opposite extending weighted portion.

7. The latch assembly as described in claim 6, further comprising an aperture defined in an upper triangular portion of said pendulum corresponding to said arcuate edge and receiving an inertial locking rivet, a plastic bushing engaging from an opposite side and in order to pivotally secure said pendulum with additional mounting locations associated with said support plates.

8. The latch assembly as described in claim 1, further comprising said planar shaped sector adapted to engaging a side location associated with a pivotal seat bottom, a second seat component exhibiting a specified shape and size and further comprising a fixed seat back.

9. The latch assembly as described in claim 1, said arcuate interior channel exhibiting a specified shape and size and further comprising a middle arcuate portion and first and second reverse arcuate extending end portions, corresponding to use and stowed positions of a rotatable seat bottom secured to said sector.

10. The latch assembly as described in claim 1, further comprising first and second pairs of spaced apart support brackets being arranged on opposite ends of first and second seat components associated with a 60/40 rear stadium seat assembly, a first latch assembly being arranged on a first side of a first selected seat component, a second latch assembly being arranged on a second opposite side of a second selected seat component.

11. The latch assembly as described in claim 10, said support plates each further comprising lower-most disposed stanchion mounting locations, fasteners being provided for securing through aligning pairs of said mounting locations and for securing each assembly to a seat side disposed floor location.

12. The latch assembly as described in claim 1, further comprising a range of inertial contacting motion established between each of first and second corner edges of said arcuate edge of said pendulum and an opposing edge of said shoulder portion.

13. An inertial latch assembly, comprising:

a planar shaped sector pivotally mounted between a pair of spaced apart support plates, said sector exhibiting a bottom extending surface further including a central projecting shoulder portion separating the bottom extending surface into first and second bottom extending surfaces, said sector further exhibiting an arcuate interior channel which is offset from said pivot mounting location, a pin extending through a second channel defined in a selected support plate and seating within said arcuate interior channel, said pin exerting a bias against said sector during travel along said interior channel;

a pendulum pivotally secured in sandwiching fashion between said support plates and proximate said bottom extending surface of said planar shaped sector, said pendulum exhibiting an arcuate edge spaced from a pivot point and relative to an opposite extending weighted portion, said arcuate edge seating against a selected one of said first and second bottom extending surfaces of said rotatable sector, depending upon a pivoted position established between said sector and said support plates; and an inertial responsive leaf spring secured to an underside of said planar shaped sector in overlaying fashion relative to first and second bottom extending surfaces, said leaf spring being initially spaced away from said sector, upon being contacted by said arcuate edge of said pendulum said leaf spring being compressed to align with a selected one of said first and second bottom extending surfaces and said arcuate edge of said pendulum;

said pendulum responding to an inertial impact condition by engaging said shoulder projection of said pivotal sector and preventing rotation of said sector relative to said support plates.

14. The latch assembly as described in claim 13, further comprising a detent lever biasingly and rotatingly secured against an exterior surface of a selected support plate opposite said sector and pendulum, said pin extending from a remote location of said detent lever offset from a pivotal connection.

15. The latch assembly as described in claim 14, further comprising an extending portion of said detent lever being engaged by a first curled extending end of said clock spring, an opposite second curled end engaging an exteriorly angled tab associated with said selected support plate, and in order to bias said detent lever in a selected rotational direction.

16. The latch assembly as described in claim 14, further comprising a clock spring rotatively biasing a pivot pin pivotally supporting said detent lever to said support plate and simultaneously biasing said remote located pin.

17. The latch assembly as described in claim 13, said arcuate interior channel exhibiting a specified shape and size and further comprising a middle arcuate portion and first and second reverse arcuate extending end portions, corresponding to use and stowed positions of a rotatable seat bottom secured to said sector.

18. The latch assembly as described in claim 13, further comprising said planar shaped sector adapted to engaging a side location associated with a pivotal seat bottom, a second seat component exhibiting a specified shape and size and further comprising a fixed seat back.

19. The latch assembly as described in claim 13, further comprising first and second pairs of spaced apart support brackets being arranged on opposite ends of first and second seat components associated with a 60/40 rear stadium seat assembly, a first latch assembly being arranged on a first side of a first selected seat component, a second latch assembly being arranged on a second opposite side of a second selected seat component.

20. The latch assembly as described in claim 19, said support plates each further comprising lower-most disposed stanchion mounting locations, fasteners being provided for securing through aligning pairs of said mounting locations and for securing each assembly to a seat side disposed floor location.

21. The latch assembly as described in claim 13, further comprising an aperture defined in an upper triangular portion of said pendulum corresponding to said arcuate edge and receiving an inertial locking rivet, a plastic bushing engaging from an opposite side and in order to pivotally secure said pendulum with additional mounting locations associated with said support plates.

22. The latch assembly as described in claim 13, further comprising a range of inertial contacting motion established between each of first and second corner edges of said arcuate edge of said pendulum and an opposing edge of said shoulder portion.

\* \* \* \* \*